(No Model.)
C. W. JONES.
PROCESS OF REVIVIFYING GAS PURIFYING AGENTS.
No. 462,137. Patented Oct. 27, 1891.
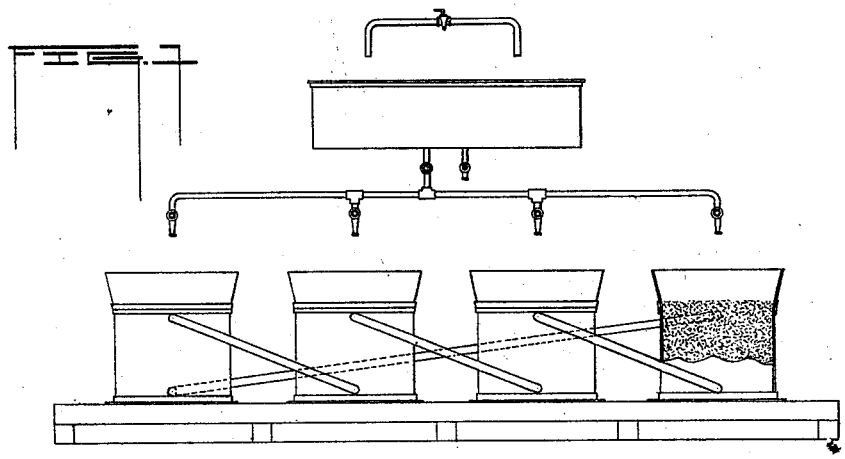
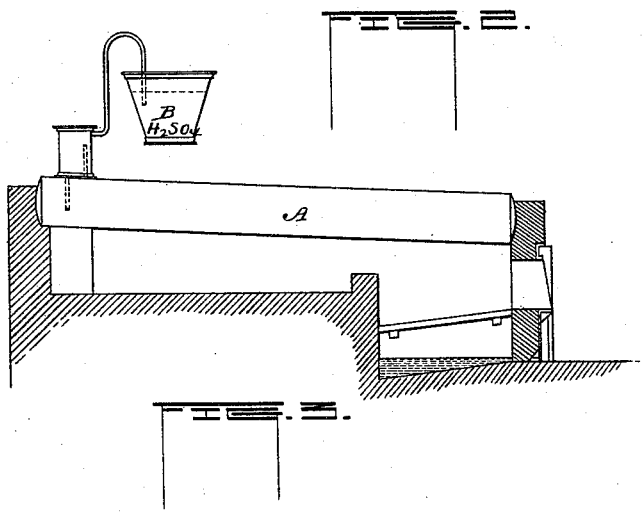
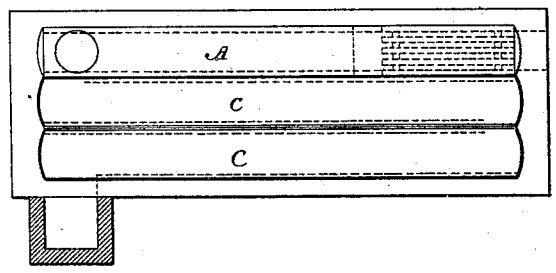
WITNESSES
INVENTOR

UNITED STATES PATENT OFFICE.

CHARLES WILLIAM JONES, OF MILAN, ITALY.

PROCESS OF REVIVIFYING GAS-PURIFYING AGENTS.

SPECIFICATION forming part of Letters Patent No. 462,137, dated October 27, 1891.

Application filed December 19, 1890. Serial No. 375,238. (No model.)

*To all whom it may concern:*

Be it known that I, CHARLES WILLIAM JONES, a citizen of England, residing at Milan, in the Province of Lombardy, Kingdom of Italy, have invented certain new and useful Improvements in Processes of Revivifying Gas-Purifying Agents; and I do hereby declare the following to be a full, clear, and exact description of the invention, such as will enable others skilled in the art to which it appertains to make and use the same.

The present invention relates to improvements in the process of revivifying or restoring the original strength and properties of the purifying material (such as Laming's oxide) employed as a purifying agent in the manufacture of gas, and which oxides become in time fouled and worthless by reason of the chemical affinity therefor and assimilation therewith of impurities in the gas, such as sulphur; and the object of the invention is to convert into activity the said material, and at the same time to obtain as residues the compositions of ferric ferri-cyanide, which render the material inert and useless as a purifying agent.

In the manufacture of gas as ordinarily practiced the purifying material (such as Laming's oxide, for instance) employed in purifying the gas becomes fouled by the deposit of impurities in the gas, and it has been common heretofore to revivify the purifying material by simply exposing and manipulating the same, as by turning it over in the open air; but in such cases a period arrives at which the material is exhausted, and is therefore often discarded as unfit for further use as a purifying agent.

The object of my invention is to restore such material to life and activity after it has reached this stage, and in order to accomplish this result I proceed as follows: I take the spent material and after dampening or slightly watering the same I mix therewith a quantity of quicklime, (which in amount I find in practice should not ordinarily exceed six per cent.,) and then heap such mixture in piles and allow it to remain until chemical reaction takes place in the mass, which will be apparent by reason of a change of color, owing principally to the oxidation of the sulphates and compounds of ferric ferri-cyanide into the corresponding salts of lime. By such chemical action the lime combines with the cyanide and the iron is set free therefrom to combine with the oxygen in the air, forming oxide of iron. The purifying material remains in the mass, but free from the salts and other impurities, and to separate it therefrom I wash the mixture in any convenient manner, and for this purpose I have designed the apparatus shown in the drawings, in which—

Figure 1 represents an elevation and partial section of a series of tanks wherein the material, after being treated as above described, may be washed. Fig. 2 represents an inside elevation and partial section of the boiler and apparatus to receive the washings and collect the ammonia. Fig. 3 is a plan of the boiler and evaporating-pans.

The material, after having been treated as above described is placed in the tanks indicated in Fig. 1, which tanks and connections may be arranged as shown, but preferably are connected by a series of pipes in such a manner that a continuous flow of water may be caused to circulate through two or more of the tanks, the pipes being so arranged and combined with suitable valve mechanism that I can cut out one or more tanks from the circuit at pleasure. The material in the tanks is washed with water, (soft water being preferably used,) which is mechanically circulated through the pipes and tanks, and while the material is being thus washed in the several tanks in the circuit the tank or tanks out of the circuit can be emptied or filled with unwashed material. Preferably the circulation of the water is such that it is caused to run finally through the last tank, so that the greater amount of impurities will be taken up thereby, and as fast as one tank is filled with unwashed material and added to the water-circuit the tank (usually the one which has been longest in the circuit) is cut out and the material remaining therein, which will be the purifying material separated from the impurities, is removed and the tank refilled with other material ready to be washed. Thus the operation of washing new portions of the material and removing the cleansed purifying agent may be continuously maintained in the series of tanks. I also preferably connect these tanks with a reservoir (not shown) to receive the washings, so that when the same are sufficiently enriched by the cyanides they may be run off into the boiler A, Fig. 2. This boiler A is closed by means of a siphon-shaped tube, which enters a vessel B, in which is placed sulphuric acid, which serves to collect the ammonia during the process of evaporation from the boiler A. The fluid is run into the evaporating-pan C, Fig. 3, where the cyanide salts are deposited, and may be obtained in the form of a paste, which may be subsequently treated, if desired, or otherwise disposed of.

I do not broadly claim herein the treatment of the spent material with lime after washing the same, as such treatment of oxides has been heretofore practiced; but such latter method is objectionable for the reason that where the washing takes place before the iron is oxidized a loss of fifty per cent. of iron results, whereas by my process the treatment of the spent oxide with the lime before washing results in the complete oxidation of the iron previous to washing, followed by the concentration of the cyanides.

The essential feature of my discovery resides in the treatment of the spent material with lime before washing it.

Having thus described my invention, I claim as new and desire to secure by Letters Patent—

1. The herein-described process of treating the spent oxides of iron or materials used in the purification of coal-gas, which consists in mixing the spent material with lime, then heaping the same and allowing it to repose until after chemical reaction takes place in the mass, and then separating the revivified material from the impurities by washing, substantially as described.

2. The herein-described process of revivifying the spent material employed in the manufacture of gas, which consists in adding lime to the spent material previous to washing, and then washing the same, substantially as described.

3. The process, substantially as herein described, of revivifying or restoring the spent material used in purifying gas, which consists in dampening the same, then mixing it with quicklime, allowing the mixed material to stand until reaction takes place, and then washing the material, so as to separate it from the impurities, as and for the purpose set forth.

In testimony whereof I affix my signature in the presence of two witnesses.

CHARLES WILLIAM JONES.

Witnesses:
MINGHETTY TESBE,
PARIS EERT.